May 11, 1965  A. W. EDWARDS  3,183,467

WINDING FOR ELECTRICAL APPARATUS

Filed April 11, 1961

INVENTOR
Andrew W. Edwards
BY Clement L. McHale
ATTORNEY 3,183,467
WINDING FOR ELECTRICAL APPARATUS
Andrew W. Edwards, Hickory Township, Mercer County, Pa., assignor to Westinghouse Electric Corporation, East Pittsburgh, Pa., a corporation of Pennsylvania
Filed Apr. 11, 1961, Ser. No. 102,188
7 Claims. (Cl. 336—223)

This invention relates to electrical apparatus and more particularly to the windings for such apparatus and a method for making such windings.

In certain types of electrical apparatus, such as transformers, a winding is provided which includes a plurality of turns of conducting sheet or foil material. In order to improve the space factor of such a winding or to make the winding structure more compact, a coating of electrically insulating material, such as an insulating enamel, may be applied to at least one side of the conducting sheet or foil material. The latter electrically insulating material may provide the necessary turn to turn insulation required in a winding of the type described. A problem arises in providing a relatively thin coating or layer of electrically insulating material having a substantially uniform thickness on a conducting sheet or foil material since conventional insulating enamels or materials tend to deposit less thickly on the edges of conducting sheet or foil material than on the intermediate surfaces of such material. At certain points along the edges of conducting sheet or foil material of the type described, the thickness of the insulation coating may be negligible or completely bare spots result along the edges of the material. The edge insulation problem described is particularly important in electrical apparatus where the potential or voltage stress during operation may be the greatest along the edges of the conducting sheet or foil material from which the windings of the apparatus are formed. In such apparatus, the absence or thinness of the edge insulation may lead to an insulation failure or voltage breakdown during the operation of the apparatus. It is therefore desirable to provide an improved winding for electrical apparatus, such as transformers, which includes a plurality of turns of conducting sheet or foil material having a coating of electrically insulating material on at least one side thereof and in which the possibility of an insulation failure or breakdown at the edges of the conducting sheet material is either substantially reduced or eliminated.

It is therefore an object of this invention to provide a new and improved winding for electrical apparatus, such as transformers.

Another object of this invention is to provide a new and improved method for forming the winding of an electrical apparatus.

A further object of this invention is to provide a new and improved means for preventing insulation failures in the windings of electrical apparatus which include a plurality of turns of conducting sheet or foil material having a coating of electrically insulating material on at least one side thereof.

A still further object of this invention is to provide a new and improved insulated conductor for use in the windings of electrical apparatus.

Other objects of the invention will, in part, be obvious and will, in part, appear hereinafter.

For a fuller understanding of the nature and objects of the invention, reference shoudl be had to the following detailed description taken in connection with the accompanying drawings, in which.

Figure 1:
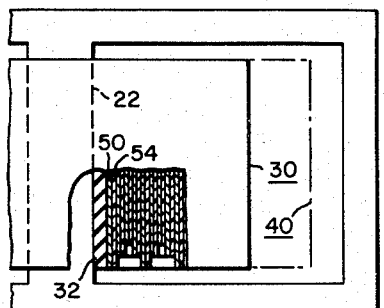
FIG. 1 is a partial elevational view, with portions broken away, of a transformer core and coil assembly illustrating a first embodiment of the invention.
Figure 3:
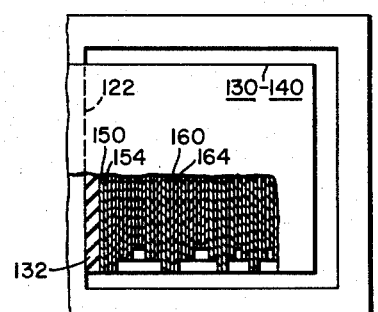
FIG. 3 is a partial elevational view, with portions broken away, of a transformer core and coil assembly illustrating a second embodiment of the invention.
Figure 4:
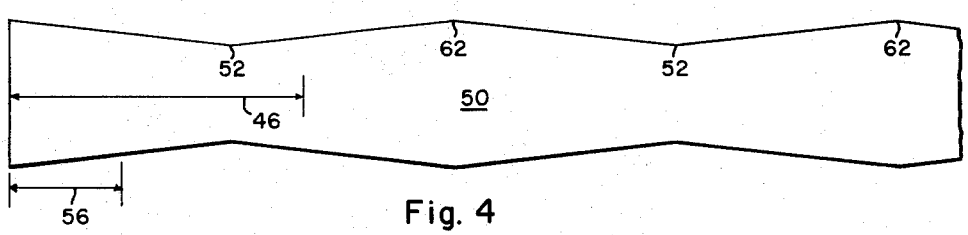
FIG. 4 is an elevational view illustrating conducting sheet or foil material from which one or more of the windings of the core and coil assemblies shown in FIGS. 1 and 3 may be formed.
Figure 6:
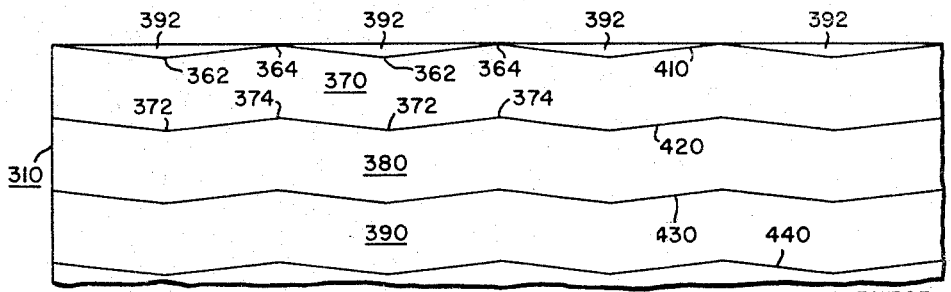
Figure 7:
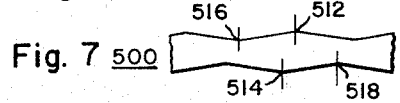

FIG. 6 is a diagrammatic view illustrating the method by which a plurality of conductors having a modified configuration may be produced from a single width of conducting sheet or foil material and employed to form the windings of the core and coil assemblies shown in FIGS. 1 and 3; and, FIG. 7 is an elevational view illustrating a modified configuration of conducting sheet or foil material similar to those shown in FIGS. 4 and 6 from which one or more of the windings of the core and coil assemblies shown in FIGS. 1 and 3 may be formed.

Figure 2:
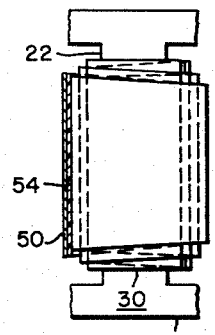
FIG. 2 is a partial elevational view illustrating the manner in which a winding of the transformer core and coil assembly shown in FIG. 1 is wound.

Referring now to the drawings and FIGS. 1 and 2 in particular, there is illustrated a transformer core and coil assembly 10 embodying the teachings of the invention. In general, the core and coil assembly 10 comprises the magnetic core structure 20 including the winding leg portion 22 on which the first and second electrical windings or coils 30 and 40, respectively, are inductively disposed. As illustrated, the first winding 30 is disposed in concentric or nested relation with respect to the second winding 40 with said first winding being disposed inside said second winding. The winding leg portion 22 of the magnetic core structure 20 is enclosed or surrounded by a tube or barrier 32 on which the windings 30 and 40 are wound.

In particular, the first winding 30 comprises a plurality of turns of a conducting sheet or strip material 50 which has a coating of electrically insulating material 54, such as an insulating enamel, on at least one side thereof to electrically insulate the respective conductor turns of said winding from one another. The conductor turns of the first winding 30 are spirally wound together around a portion of the magnetic core structure 20, more specifically the winding leg portion 22. The tube 32 on which the turns of the winding 20 are wound provides mechanical support for the windings 30 and 40 and may be formed from electrically insulating material to insulate the first winding 30 from the winding leg portion 22 of the magnetic core 20. The conducting sheet or foil material 50 is of the general type in which the axial or transverse dimension of the material is relatively large compared to the radial dimension or thickness, said axial dimension being at least several times said radial dimension. The second winding 40 may be of the same construction as just described for the first winding 30 or the second winding 40 may be of any conventional construction which includes a plurality of conductor turns, as required in a particular application.

Referring now to FIG. 4, there is illustrated in greater detail the conducting sheet or foil material 50 from which the turns of the winding 30 are formed. As indicated previously, the conducting sheet material 50 may be coated on one or both sides with an electrically insulating material, such as an insulating enamel. The conducting sheet material 50 as shown in FIG. 4 is of a general type whose width or transverse dimension is continuously and cyclically varying between predetermined maximum and minimum values or limits as indicated at 62 and 52, respectively, in FIG. 4. In other words, the distances between corresponding points on each of the edges of the conducting sheet material 50 and a central axis which extends longitudinally of said material vary in a continuous manner in a repeated pattern between maximum and minimum values as indicated at 62 and 52, respectively. It should be noted that the distances between the corresponding points on the edges of the conducting sheet material 50 and the central axis of said material just mentioned are substantially equal or symmetrical with respect to said central axis. Since the transverse dimension of the conducting sheet material 50 varies in a continuous manner, the points of maximum and minimum width of said material are longitudinally displaced from one another as shown in FIG. 4.

Referring now to FIG. 2, there is illustrated a portion of the turns of the winding 30 which correspond to the longitudinal dimension of the conducting strip material 50, as indicated at 46 in FIG. 4. The longitudinal dimension of the conducting sheet material 50 which corresponds to the innermost or first turn of the winding 30 is indicated at 56 in FIG. 4. When the turns of the conducting sheet material 50 are spirally wound on the winding leg portion 22 of the magnetic core 20, as best shown in FIG. 2, the upper and lower edges of the turns of the conducting sheet material 50 follow generally helical paths with the edges of the adjacent turns of the conducting sheet material 50 at each end of the winding 30 being axially displaced from one another. The latter axial displacement of the edges of the adjacent turns of the conducting sheet material 50 at each end of the winding 30 substantially reduces or eliminates the possibility of insulation or dielectric failure or breakdown between the adjacent turns of said winding at the edges of the conducting sheet material 50 due to the absence or insufficient thickness of the electrically insulating material 54 which is disposed on at least one side of said conducting sheet material which may occur at certain points along the edges of the latter material. It should be noted that the latter type of insulation failure is also substantially reduced or prevented because the points of maximum width of the conducting sheet material 50 are radially displaced from one another in the winding 30 wherever they occur in adjacent turns by at least a portion of a turn. In order to avoid having the points of maximum width of the conducting sheet material 50 disposed adjacent to one another in adjacent turns of the winding 30, the points of maximum width of the conducting sheet material 50 are preferably displaced from one another longitudinally of said conducting sheet material by a distance which is greater than the maximum outer peripheral dimension or circumference of the winding 30.

Referring now to FIG. 3, there is illustrated a second transformer core and coil assembly 100 embodying the teachings of the invention. Similarly, to the core and coil assembly 10, the core and coil assembly 100 comprises a magnetic core structure 120 including a winding leg portion 122 on which the associated first and second windings 130 and 140, respectively, are inductively disposed. The windings 130 and 140 are wound on a tube or barrier member 132 which may be formed from electrically insulating material similarly to the tube 32 in the core and coil assembly 10.

More specifically, the first winding 130 of the core and coil assembly 100 comprises a plurality of spirally wound turns of a first conducting sheet or foil material 150 having a coating of electrically insulating material 154, such as an insulating enamel, on at least one side thereof similarly to the winding 30 of the core and coil assembly 10. The second winding 140 of the core and coil assembly 100 also includes a plurality of spirally wound turns of a second conducting sheet or strip material 160 having a coating of electrically insulating material, such as an insulating enamel, on at least one side thereof, similarly to the first windings 30 of the core and coil assembly 10 and to the first winding 130 of the core and coil assembly 100. The conducting sheet materials 150 and 160 of the windings 130 and 140, respectively, may be of the same configuration as the conducting sheet material 50 from which the turns of the winding 30 are formed. The respective conductor turns of the windings 130 and 140 are continuously interleaved with one another rather than having the turns of the respective windings separated from one another as are the turns of the windings 30 and 40 of the core and coil assembly 10. The continuous interleaving of the respective turns of the windings 130 and 140 of the core and coil assembly 100 results in a uniform voltage or potential stress between the adjacent turns of said winding during the operation of the core and coil assembly 100 and avoids certain mechanical bracing problems which would otherwise be present. In addition, the continuous interleaving of the turns of the windings 130 and 140 provides a predetermined capacitance between the adjacent turns of the respective windings as disclosed in greater detail in copending application Serial No. 745,555, now abandoned, which was filed, June 30, 1958, by A. M. Lockie and assigned to the same assignee as the present application and which covers a winding construction of the same general type as shown in FIG. 3 except that the winding construction employs conducting sheet material of a substantially constant width or transverse dimension.

The construction of the core and coil assembly 100 offers similar advantages to those of the core and coil assembly 10 with respect to the possibility of the insulation failure or breakdown at the edges of the conductor turns of the respective windings due to the absence or lack of sufficient thickness of the coating of electrical insulating material at said edges. When the turns of conducting sheet material of the windings 130 and 140 are wound together and continuously interleaved with the corresponding widths of the conducting sheet materials 150 and 160 being substantially equal as the combined turns of the windings 130 and 140 are wound together, the edges of the adjacent combined turns of the windings 130 and 140 at each end of said windings are axially displaced from one another with the points of maximum width of said conducting sheet materials being radially displaced from one another by at least the portion of a turn. It is to be understood that in a particular application, the width of the conducting sheet materials 150 and 160 need not be substantially equal at all corresponding points of the combined turns of the windings 130 and 140 in order to further reduce the possibility of an insulation failure or breakdown at the edges of the conducting sheet materials which make up the individual turns of the combined turns of the windings 130 and 140. In other words, in the latter arrangement, the edges of the conducting sheet materials 150 and 160 which make up each of the combined turns of the windings 130 and 140 would be axially displaced with respect to one another at each point along the edges of said materials at the upper and lower ends of the windings 130 and 140.

Figure 5:
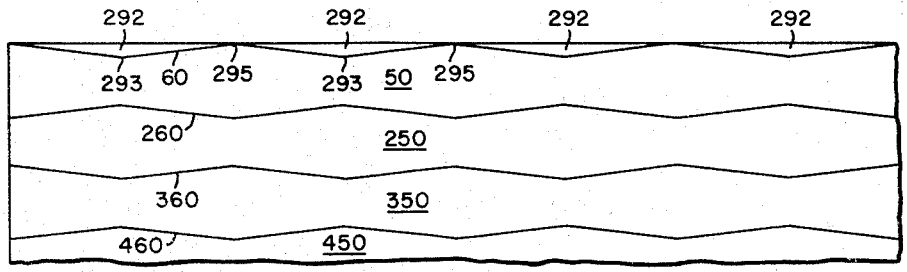
FIG. 5 is a diagrammatic view illustrating the method by which a plurality of conductors similar to the conductors shown in FIG. 4 may be formed from a single width of conducting sheet material.

Referring now to FIG. 5, there is illustrated a preferred method of forming a plurality of conductors similar to the conductor 50 from a single width of conducting sheet material 210 which reduces the scrap resulting therefrom. The conducting sheet material 210 is of a general type which has a width or transverse dimension at least several times its thickness and in this case having a width which is at least several times the maximum width of each of the plurality of conductors 50, 250, 350 and 450 which are to be formed therefrom. As indicated in FIG. 5, the first step in forming a plurality of conductors from the conducting sheet material 210 is to cut or slit the conducting sheet material 210 along a plurality of lines as indicated at 60, 260, 360 and 460 which extend longitudinally of said sheet material to form a plurality of conductors 50, 250, 350 and 450, which are disposed in side by side relationship. Each of the lines 60, 260, 360 and 460 is generally sawtoothed or scalloped in configuration to form a series of successive alternate projecting and recess portions, as indicated at 295 and 293, respectively, in each of the conductors 50, 250, 350 and 450. The projecting portions 295 of each of the conductors 50, 250, 350 and 450 interfit or intermesh with the recessed portions 293 of the adjacent conductors to reduce the scrap resulting therefrom, as indicated at 292, at the edges of the conducting sheet material 210. The latter cutting or slitting operation is preferably performed prior to the application of a coating of electrically insulating material to at least one side of the individual conductors 50 through 450. After the conducting sheet material 210 has been cut or slit as indicated in FIG. 5, the individual conductors 50, 250, 350 and 450 are separated from one another. The individual separated conductors 50, 250, 350 and 450 are then separately coated with an electrically insulating material, such as an insulating enamel, which is deposited or applied on at least one side of the individual conductors 50, 250, 350 and 450.

Referring now to FIG. 6, there is illustrated an alternative method for forming a plurality of conductors from a single width of conducting sheet material 310. Each of the conductors 370, 380 and 390 which are formed from the conducting sheet material 310 as shown in FIG. 6, may be substituted for the conductor 50 in forming the windings of the core and coil assemblies 10 and 100 shown in FIGS. 1 and 3, respectively. The conducting sheet material 310 may be of the same type as the conducting sheet material 210 previously described. In forming the plurality of conductors 370, 380 and 390 from the conducting sheet material 310, the first step is to cut or slit the conducting sheet material 310 along a plurality of substantially parallel lines which extend longitudinally of the conducting sheet material 310 to form a plurality of individual conductors 370, 380 and 390 which are disposed in side by side relationship. Each of the lines 410, 420, 430 and 440 is displaced from the central axis of the sheet material 310 by a distance which is continuously and cyclically varying between substantially predetermined maximum and minimum values and limits in opposite directions as indicated at 364 and 362, respectively, for the line 410 and at 374 and 372, respectively, for the line 420. It is to be noted that each of the lines 410, 420, 430 and 440 is generally sawtoothed or serrated in configuration similarly to the lines 60, 260, 360 and 460 in the conducting sheet material 210 except that the lines 410, 420, 430 and 440 are substantially parallel to one another to form a plurality of conductors 370, 380 and 390 each of which has a substantially predetermined constant width or transverse dimension. Similarly to the previous method described, the cutting or slitting of the conducting sheet material 310 is preferably performed prior to the coating of the conducting sheet material 310 with an electrically insulating material, such as an insulating enamel, in order that such electrically insulating material not be damaged during or by the cutting or slitting operation. After the latter cutting or slitting operation is performed, the conductors 370, 380 and 390 are separated from one another. Finally, the conductors 370, 380 and 390 are separately coated with an electrically insulating material which is deposited or applied on at least one side of each of the individual separated conductors. A core and coil assembly including windings formed from the conductors 370, 380 and 390 would offer the same advantages previously described in detail in connection with the conductor 50. It is to be noted that the scrap pieces 392 which result at the edges of the conducting sheet material 310 are minimized similarly to the scrap pieces 292 which result from the method employed to form a plurality of conductors from the conducting sheet material 210 previously described.

Referring to FIG. 7, there is illustrated a conducting sheet or foil material 500 which is the same as the sheet material 50 shown in FIG. 4 except that the edges are not symmetrical with respect to a central axis which extends longitudinally of the material 500. While both edges of the material are generally scalloped or serrated, the respective points of maximum displacement from the central axis on the edges thereof, as indicated at 512 and 514, and the respective points of minimum displacement from the central axis, as indicated at 516 and 518, are axially displaced from one another. In other words, there need be no particular relationship between the points of maximum and minimum displacement with respect to a central axis on the edges of the material 500, although the symmetry provided in the material 50 and in the conductors 370, 380, 390 previously described is preferable from the standpoint of scrap or waste when forming such materials or conductors.

It is to be understood that in certain applications that any of the disclosed conductor configurations may be coated on both sides with an electrically insulating material. It is also to be understood that teachings of the invention may be incorporated in other types of electrical apparatus, such as reactors, autotransformers, or capacitors.

The apparatus embodying the teachings of this invention has several advantages. For example, the insulation problems resulting from the absence or lack of sufficient insulation on the edges of conducting sheet material employed in the windings of such apparatus are substantially reduced or eliminated. In addition, the methods disclosed for forming the different conductor configurations in accordance with the teachings of the invention reduce the scrap resulting therefrom to a minimum. Finally, the winding constructions disclosed should permit the application of conducting sheet material of the type disclosed at higher operating potentials than would otherwise be possible with conventional winding constructions.

Since numerous changes may be made in the above described apparatus and methods and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. A winding for electrical inductive apparatus comprising a plurality of spirally wound turns of conducting strip material, said strip material having a coating of electrical insulation on at least one side thereof substantially coextensive with the strip, said strip material having a pair of longitudinal edges, said longitudinal edges being generally scalloped, said longitudinal edges of said material being displaced from a straight reference line lying between said edges in a continuously varying manner between substantially predetermined limits.

2. A winding for electrical inductive apparatus comprising a plurality of spirally wound turns of conducting strip material having a substantially constant width, said strip material having a substantially coextensive coating of electrical insulation on at least one side thereof, said strip material having a pair of longitudinal edges, said longitudinal edges of said strip material being generally scalloped, said longitudinal edges of said material being displaced in opposite directions from a reference line in a continuously varying manner between substantially predetermined limits.

3. A winding for electrical inductive apparatus comprising a plurality of spirally wound turns of conducting strip material, said strip material having a coating of electrically insulating material substantially coextensive with the strip thereon, said strip having two generally longitudinal sides, the width of said conducting strip material varying between substantially predetermined maximum and minimum widths with reference to a reference lying between said two sides, the points of maximum width of said conducting sheet material being displaced from one another with respect to said reference along the two sides of said strip.

4. A winding for electrical inductive apparatus comprising a plurality of spirally wound turns of conducting strip material, said strip material having a coating of electrically insulating material substantially coextensive with the strip thereon, said strip having two generally longitudinal sides, the width of said conducting strip material varying in a repetitive pattern between substantially predetermined maximum and minimum widths with respect to a reference lying between the two sides of said strip, the points of maximum width of said conducting strip material with respect to said reference being radially displaced from one another along the two sides of said strip, by a distance greater than the outer peripheral dimension of said winding.

5. A winding for electrical inductive apparatus comprising a plurality of turns of conducting sheet material, said sheet having a longitudinal dimension at least several times that of its transverse dimension, said sheet having a substantially coextensive coating of electrical insulation on at least one side thereof, said sheet material having a pair of generally scalloped longitudinal edges, the distance between each of the edges of said material and a reference axis lying between the edges of said sheet material cyclically varying between predetermined limits, the edges of said conducting sheet material at both ends of said winding following generally helical paths.

6. A conductor for electrical apparatus comprising sheet material having a width at least several times its thickness, said sheet having a coating of electrical insulation substantially coextensive therewith on at least one side thereof, said sheet having a pair of generally scalloped longitudinal edges, the distance between each of the edges of said material and a central reference axis extending through said material between said edges continuously varying between substantially predetermined limits.

7. A conductor for electrical apparatus comprising strip material, said strip material having a substantially coextensive coating of electrically insulating material thereon and a transverse dimension at least several times the thickness thereof, said strip having a pair of generally longitudinal edges, a reference axis located between said edges, the transverse dimension of said strip material continuously varying between substantially predetermined maximum and minimum limits, the points of maximum transverse dimension of said strip material on each side of said reference axis being displaced from one another along the edges of said strip material.

References Cited by the Examiner

UNITED STATES PATENTS

| | | | |
|---|---|---|---|
| 252,634 | 1/82 | Waring | 29—155.5 |
| 304,170 | 8/84 | Cady | 174—117 |
| 540,323 | 6/95 | Loomis et al. | 336—223 |
| 717,778 | 1/03 | Spaulding | 174—117 |
| 926,964 | 7/09 | Schrader | 336—223 |
| 1,227,346 | 5/17 | Trood et al. | 29—155.5 |
| 2,927,291 | 3/60 | Ruehle | 336—223 |
| 2,961,747 | 11/60 | Lyman | 336—223 |

FOREIGN PATENTS 550,963  11/56  Italy.

JOHN F. BURNS, *Primary Examiner.*

ORIS L. RADER, E. JAMES SAX, *Examiners.*